(12) United States Patent
Heitel

(10) Patent No.: US 7,302,988 B2
(45) Date of Patent: Dec. 4, 2007

(54) BREAKAWAY WINDOW AWNING GUIDE

(75) Inventor: Robert G. Heitel, Laguna Beach, CA (US)

(73) Assignee: Girard Systems, San Clemente, CA (US)

( * ) Notice: Subject to any disclaimer, the term of this patent is extended or adjusted under 35 U.S.C. 154(b) by 392 days.

(21) Appl. No.: 11/032,433

(22) Filed: Jan. 10, 2005

(65) Prior Publication Data

US 2006/0151128 A1 Jul. 13, 2006

(51) Int. Cl.
*A47H 3/00* (2006.01)

(52) U.S. Cl. .................. 160/274; 160/278; 160/266

(58) Field of Classification Search ............ 160/274, 160/275, 276, 278, 281, 266, 267, 370.22, 160/290.1, 178.1 R
See application file for complete search history.

(56) References Cited

U.S. PATENT DOCUMENTS

| 5,025,847 | A | * | 6/1991 | Mueller | 160/270 |
| 5,765,622 | A | * | 6/1998 | Lichy | 160/273.1 |
| 6,089,305 | A | * | 7/2000 | Gruben et al. | 160/271 |
| 6,315,027 | B1 | * | 11/2001 | Lichy | 160/205 |
| 6,901,703 | B2 | * | 6/2005 | Langenbach | 49/197 |

\* cited by examiner

*Primary Examiner*—Blair M. Johnson
(74) *Attorney, Agent, or Firm*—Walter A. Hackler

(57) ABSTRACT

A breakaway awning includes an awning moveable between an open position and a closed position and having a lead rail attached to a leading edge of the awning. A pair of tracks mountable on opposite sides of a window are provided with longitudinal slots therein. Track guides are slidably disposed within a corresponding slot and awning guides are fixed to opposite ends of the lead rail. Track guide fittings and awning guide fittings engagable with one another enable both longitudinal movement of the lead rail along the tracks and transverse separation of the lead rail and awning guides from the track guides and track upon the application of force thereto thus facilitating egress from the underline window.

12 Claims, 3 Drawing Sheets

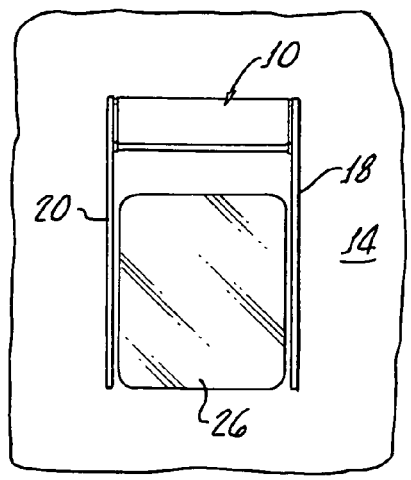
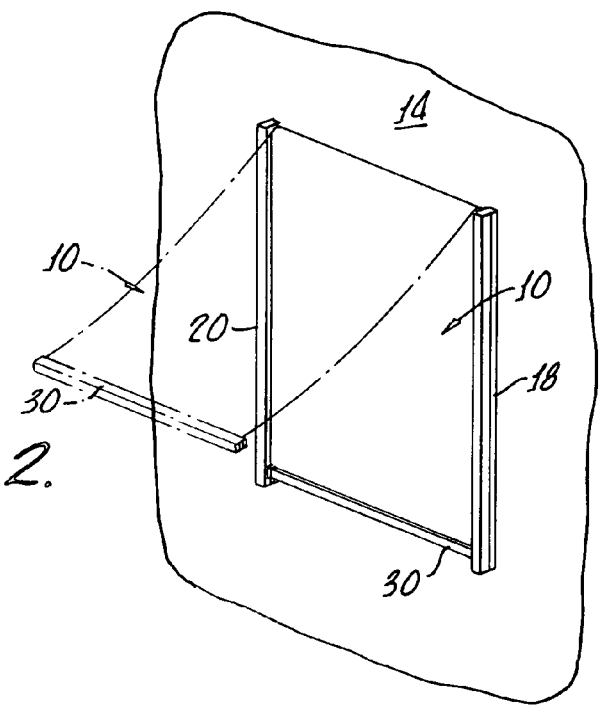
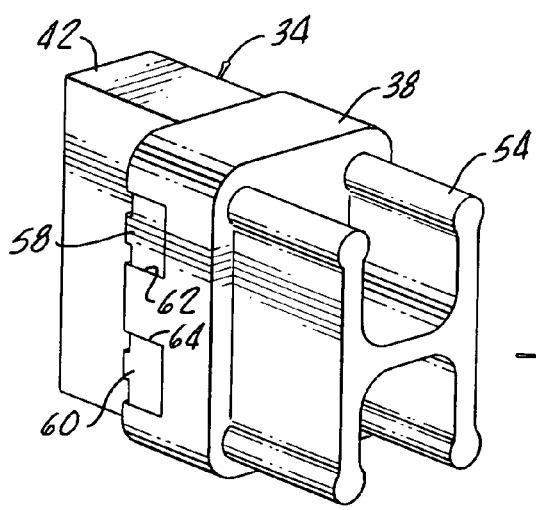

BREAKAWAY WINDOW AWNING GUIDE

Awnings or rollup shades and sunscreen are often used in recreational vehicles to shield the inside of the vehicle from sunlight or bright lights.

Often such awnings are mounted on the side of a coach utilizing tracks on opposite side of a window to be covered.

Recreational vehicles, or coaches, are often fitted with breakaway windows for safety purposes. Such windows, breakaway, or pop out, of a frame supporting the window by use of an abrupt force, i.e., a kick.

However, in view of the fact that the window awning material is very strong and not torn easily, such awning when installed on the exterior of a coach inhibit egress from the coach even when the window is popped out.

The present invention provides for a breakaway window awning and guide which enables quick separation of the awning from the coach in the event it is necessary to pop out the underlying window.

SUMMARY OF THE INVENTION

A breakaway window awning in accordance with the present invention generally includes an awning having a lead rail with the awning being movable between an open position exposing a window in a closed position covering the window. A lead rail is attached to a leading edge of the awning and a pair of tracks is provided with each of the pair of tracks mountable on opposite sides of the window, each track having a longitudinal slot therein.

A pair of track guides is provided with each of the pair track guides slidably disposed in a corresponding track slot and a pair of awning guides is provided with each awning guide fixed to opposite ends of the lead rail.

More specifically, track guide fittings and awning guide fittings are provided and engagable with one another for enabling both longitudinal movement of the lead rail along the tracks and transverse separation of the lead rail and awning guides from the track guides and track. This transverse separation enables the awning to swing away from the window thus enabling egress therefrom.

More particularly, the breakaway window awning in accordance with the present invention includes track guide fittings, which include at least one protruding lug and the awning guide fittings each include at least one groove for receiving a corresponding protruding lug. Alternatively, two protruding lugs and two grooves may be utilized in accordance with the present invention.

Preferably, the protruding lugs and grooves are disposed transversed to the longitudinal track slots.

Still more particularly, the protruding lugs may include centering berms for releasably engaging a corresponding centering notch disposed in a corresponding groove. Preferably, the berm comprises a leaf-type spring for releasably engaging a corresponding notch.

Alternatively, in accordance with the present invention, the guide fittings may include at least one protruding lug and the track fittings include at least one groove for releasably engaging the corresponding protruding lug.

The present invention also provides an improvement for existing awnings which includes a pair of track guides each of the pair of track guides slidably disposable in a track slot along with awning guides with each awning guides fittable to opposite ends of a lead rail.

Track guide fittings are provided along with awning guide fittings which are engagable with one another for enabling longitudinal movement of the lead rail along a mounting track and transverse a separation of the lead rail from the track upon application of force thereto.

BRIEF DESCRIPTION OF THE DRAWINGS

The advantages and features of the present invention will be better understood by the following description when considered in conjunction with the accompanying drawings in which:

FIG. 1 is a plan view of an awning mounted for shading a window along the tracks on a side of a recreational vehicle, not totally shown;

FIG. 2 is a perspective view of the awning shown in FIG. 1 illustrating a breakaway or transverse movement of the awning from the wall and egress from a window;

FIG. 3 is a perspective view of a coupled track guide, and awning guide;

DETAILED DESCRIPTION

Figure 4:
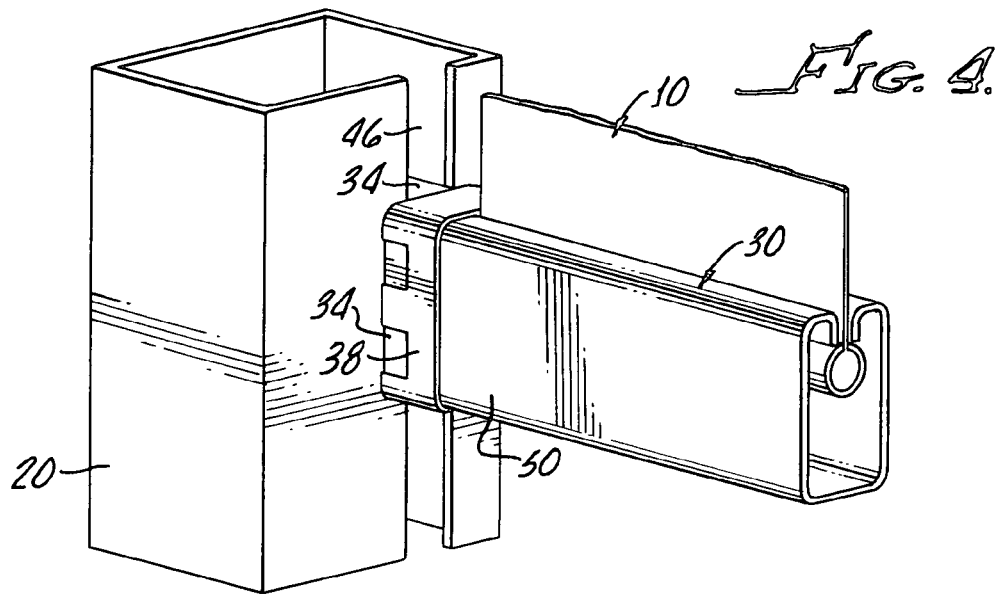
FIG. 4 is an enlarged view of an awning lead rail coupled to a track through the use of the guides shown in FIG. 3 with the awning and lead rail in a position for longitudinal term movement of the awning along the rail.

With reference to FIG. 1, there is shown an awning, or shade, 10 in accordance with the present invention as it may be mounted on a wall 14 of a motor coach, or the like, (not shown) by means of tracks 18, 20, the tracks 18, 20 being fixed to the wall 14 in any conventional manner on opposite sides of a window 26.

FIG. 2 illustrates the awning in a closed position covering the window 26 and illustrating end dashed line separation of a lead rail 30 from the tracks 18, 20 for enabling easy egress from the window 26 when separated away from the coach. The break away window 26 is not part of the present invention.

As illustrated in FIG. 3, the break away action of the window awning in accordance with the present invention is enabled through the use of a pair of track guides 34 and awning guides 38, only one of each track guide 34 and awning guide 38 being illustrated, the pairs being of identical construction.

Figure 5:
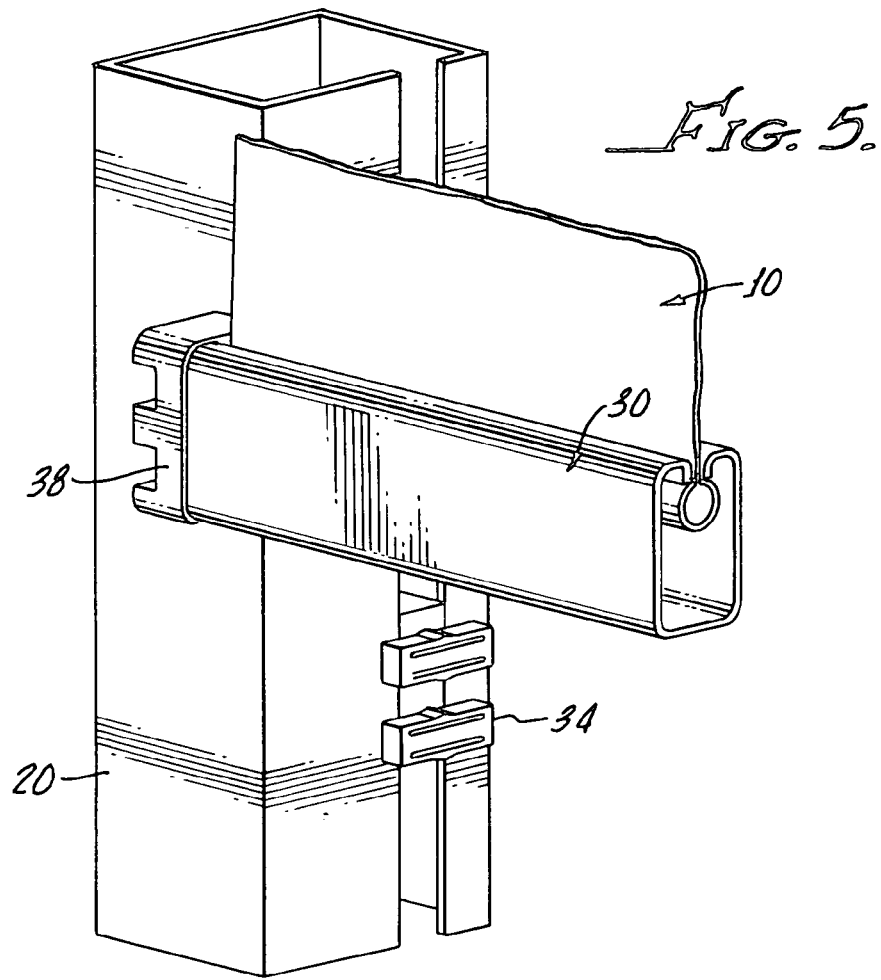
FIG. 5 is a perspective view showing the lead rail and awning separated from the track and track guide.

With continued reference to FIG. 3 and reference to FIGS. 4 and 5, the track guide 34 includes a body 42 (see FIG. 3) slidably disposed in a track slot 46 (see FIG. 4).

Each of the awning guides 38 may be attached to opposite ends 50 of the lead rail 30 in any suitable manner, such as, for example, a projection 54 sized being received by the lead rail hollow end 50, the projection 54 being illustrated in FIG. 3. As shown in FIGS. 3-5 the track guides 34 may include protruding fittings 58, 60 which are engagable with grooves 62, 64 and the awning guides 38. Preferably, the protrusions 58, 60 and grooves 62, 64 are disposed in a transverse position with regard to the longitudinal track slot 46, however, any other relationship is also to be considered to be within the scope of the present invention.

Figure 6:
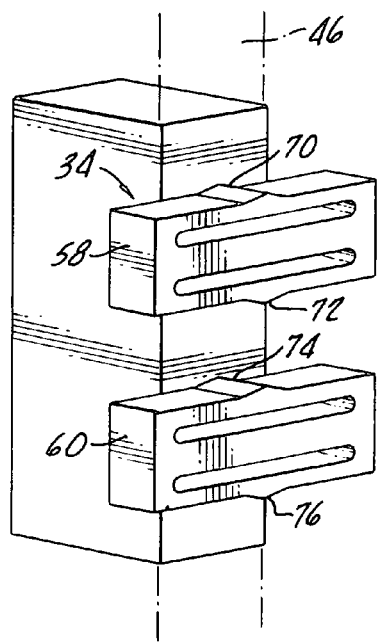
FIG. 6 is an enlarged perspective view of the track guide.
Figure 7:
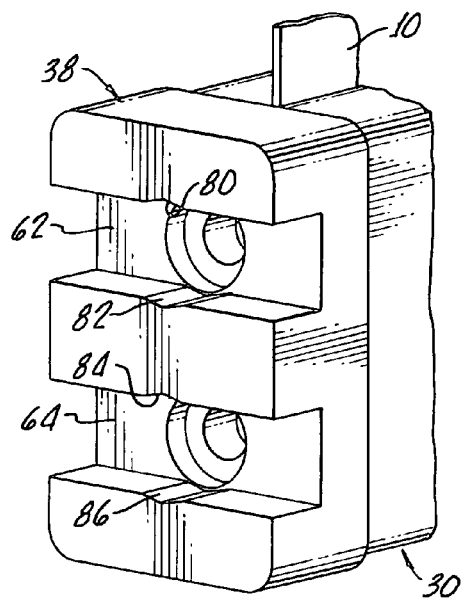
FIG. 7 is an enlarged perspective view of the awning guide.

FIG. 5 illustrates the track guides 34 and awning guides separated from one another with the lead rail freed from the track in FIGS. 6 and 7 illustrate respectively the track guide 34 and awning guide 38.

With reference to FIG. 6, in order to prevent inadvertent separation of the track guide 34 and awning guide 38, centering berms 70, 72, 74, 76 may be provided for engaging corresponding notches 80, 82, 84, 86 in the awning track grooves 62, 64. Preferably, the berms 70, 72, 74, 76 are in the form of leaf springs for exerting retaining forces against the corresponding notches 80, 82, 84, 86, however, any suitable releasing mechanism may be utilized.

Figure 8:
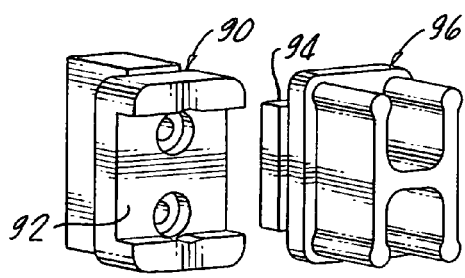
FIG. 8 is a perspective view of an alternative embodiment of track and awning guides.
Figure 9:
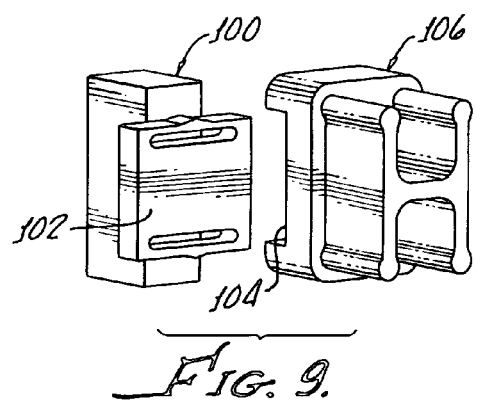
FIG. 9 is yet another alternative embodiment of a track and awning guides in accordance with the present invention.

Alternative embodiments of the present invention are illustrated in FIGS. 8 and 9.

In FIG. 8, a track guide 90 includes a groove 92 for receiving a protruding fitting 94 of an awning guide 96. In this embodiment, only a single protruding fitting 94 ends and single groove 92 are utilized.

With reference to FIG. 9, a track awning 100 includes a single protruding fitting 102 which is received by a single groove 104 in a corresponding awning fitting 106.

It should be noted that mechanism for rolling and unrolling an awning is conventional in nature and not illustrated for the sake of clarity.

Although there has been hereinabove described a specific breakaway window awning guide in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A breakaway window awning:
   an awning movable between an open position, exposing a window, and a closed position, covering said window;
   a lead rail attached to a leading edge of said awning;
   a pair of tracks, each of the pair of tracks mountable on opposite sides of said window, each track having a longitudinal slot therein;
   a pair of track guides, each of the pair of track guides slidably disposed in a corresponding slot;
   a pair of awning guides, each awning guide fixed to opposite ends of said lead rail; and
   track guide fittings and awning guide fittings engagable with one another and enabling both longitudinal movement of said lead rail along the tracks and transverse separation of said lead rail and awning guides from the track guides and track, each track guide fitting including at least one protruding lug and said awning guide fittings each include at least one groove receiving a corresponding protruding lug, each of the protruding lugs including a leaf type spring centering berm releasably engaging a corresponding centering notch disposed in a corresponding groove.

2. The breakaway window awning according to claim 1 wherein the protruding lugs and grooves are disposed transverse to the longitudinal track slots.

3. The breakaway window awning according to claim 1 wherein said track guides fittings include two protruding lugs and said awning guides fitting includes two grooves.

4. A breakaway window awning:
   an awning movable between an open position, exposing a window, and a closed position, covering said window;
   a lead rail attached to a leading edge of said awning;
   a pair of tracks, each of the pair of tracks mountable on opposite sides of said window, each track having a longitudinal slot therein;
   a pair of track guides, each of the pair of track guides slidably disposed in a corresponding slot;
   a pair of awning guides, each awning guide fixed to opposite ends of said lead rail; and
   track guide fittings and awning guide fittings engagable with one another and enabling both longitudinal movement of said lead rail along the tracks and transverse separation of said lead rail and awning guides from the track guides and track, said awning guide fittings each including at least one protruding lug and said track guide fittings each including at least one groove receiving a corresponding protruding lug, each of the protruding lugs including a leaf type spring centering berm releasably engaging a corresponding centering notch disposed in a corresponding groove.

5. The breakaway window awning according to claim 4 wherein the protruding lugs and groove are disposed transverse to the longitudinal track slot.

6. The breakaway window awning according to claim 4 wherein said track guide fitting includes two grooves and said awning guide fitting includes two protruding lugs.

7. In window awning apparatus having an awning with a lead rail, said awning being moveable between an open position, exposing a window, and a closed position, covering said window, a lead rail attached to a leading edge of said awning a pair of tracks, each of the pair of tracks mountable on opposite sides of said window, each track having a longitudinal slot therein, the improvement comprising:
   a pair of track guides, each of the pair of track guides slidably disposed in a corresponding slot;
   a pair of awning guides, each awning guide fixed to opposite ends of said lead rail; and
   track guide fittings and awning guide fittings engagable with one another and enabling both longitudinal movement of said lead rail along the tracks and transverse separation of said lead rail and awning guides from the track guides and track, said track guide fittings each including at least one protruding lug and said awning guide fittings each include at least one groove receiving a corresponding protruding lug, each of the protruding lugs including a leaf type spring centering berm releasably engaging a corresponding centering notch disposed in a corresponding groove.

8. The improvement awning according to claim 7 wherein the protruding lugs and grooves are disposed transverse to the longitudinal track slots.

9. The improvement according to claim 7 wherein said track guides fittings include two protruding lugs and said awning guides fitting includes two grooves.

10. In window awning apparatus having an awning with a lead rail, said awning being moveable between an open position, exposing a window, and a closed position, covering said window, a lead rail attached to a leading edge of said awning a pair of tracks, each of the pair of tracks mountable on opposite sides of said window, each track having a longitudinal slot therein, the improvement comprising:
   a pair of track guides, each of the pair of track guides slidably disposed in a corresponding slot;

a pair of awning guides, each awning guide fixed to opposite ends of said lead rail; and track guide fittings and awning guide fittings engagable with one another and enabling both longitudinal movement of said lead rail along the tracks and transverse separation of said lead rail and awning guides from the track guides and track, said awning guide fittings each including at least one protruding lug and said track guide fittings each including at least one groove receiving a corresponding protruding lug, each of the protruding lugs including a leaf type spring centering berm releasably engaging a corresponding centering notch disposed in a corresponding groove.

11. The breakaway window awning according to claim 10 wherein the protruding lugs and groove are disposed transverse to the longitudinal track slot.

12. The breakaway window awning according to claim 10 wherein said track guide fitting includes two grooves and said awning guide fitting includes two protruding lugs.

* * * * *